C. LAPORTE.
SHOCK ABSORBER.
APPLICATION FILED NOV. 22, 1913.
1,177,876.
Patented Apr. 4, 1916.
2 SHEETS—SHEET 1.
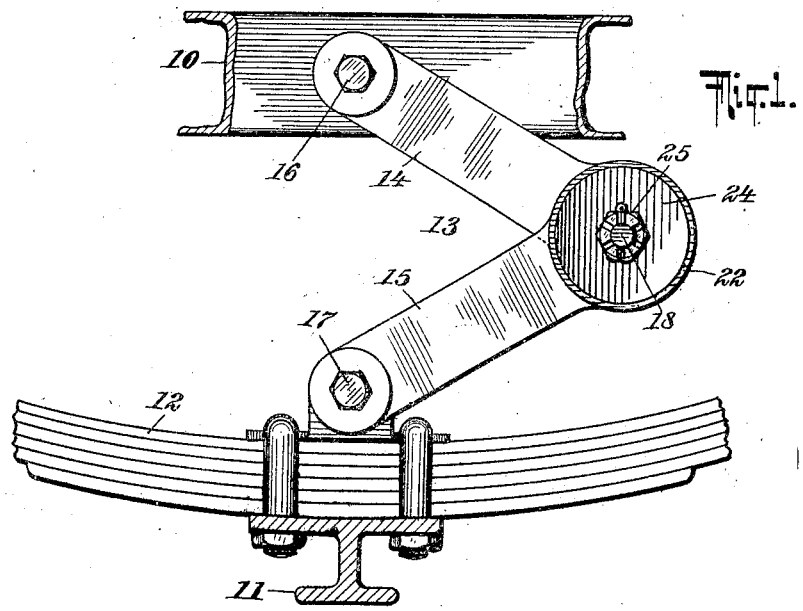
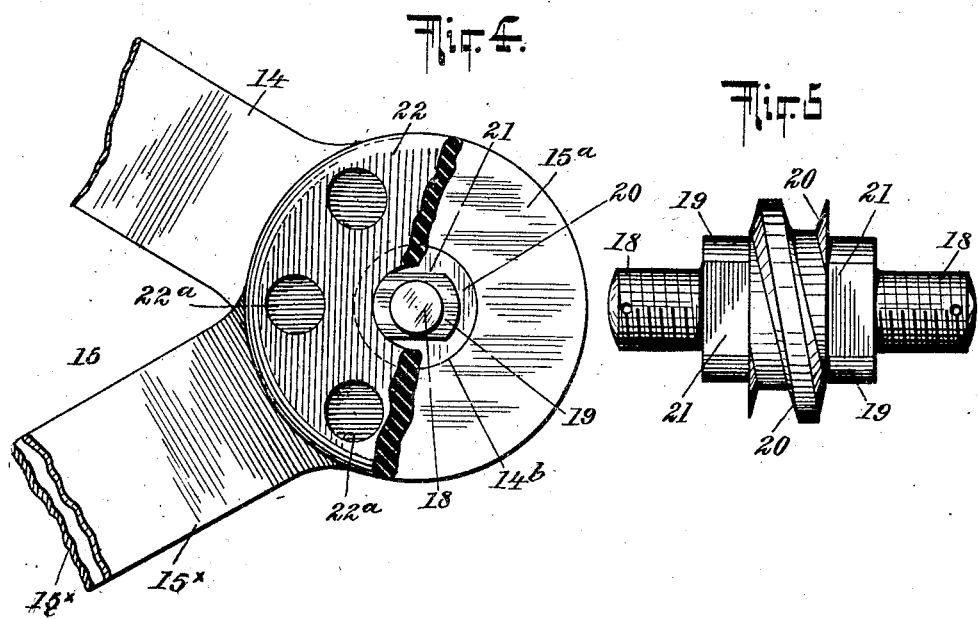
WITNESSES:
Edwin H. Dietrich
Millie Tetzlaff
INVENTOR
CHARLES LAPORTE.
BY
Conrad A. Dietrich
his ATTORNEY.

C. LAPORTE.
SHOCK ABSORBER.
APPLICATION FILED NOV. 22, 1913.
1,177,876.
Patented Apr. 4, 1916.
2 SHEETS—SHEET 2.
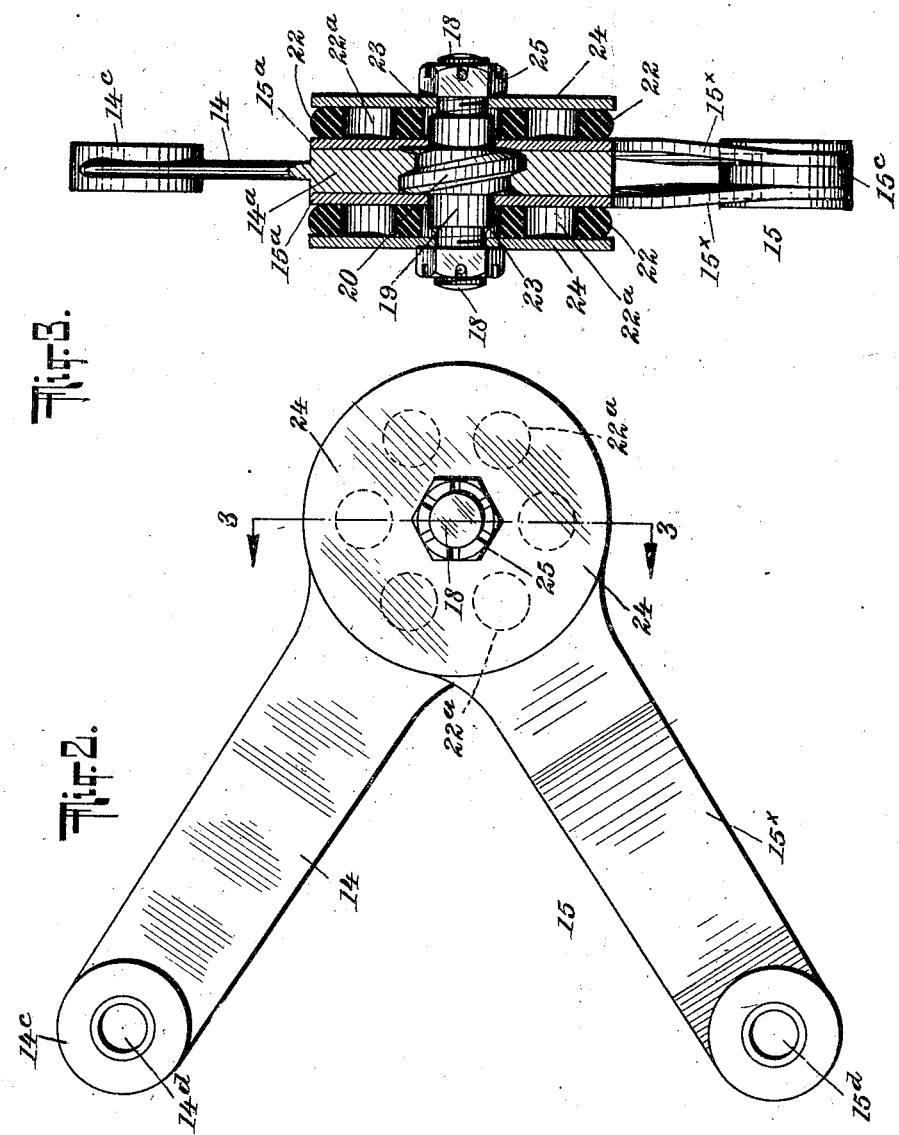
WITNESSES:
INVENTOR
CHARLES LAPORTE

UNITED STATES PATENT OFFICE.

CHARLES LAPORTE, OF NEW YORK, N. Y.

SHOCK-ABSORBER.

1,177,876.  Specification of Letters Patent.  Patented Apr. 4, 1916.

Application filed November 22, 1913. Serial No. 802,367.

*To all whom it may concern:*

Be it known that I, CHARLES LAPORTE, a citizen of the United States, residing at the city of New York, borough of Manhattan, in the county and State of New York, have invented certain new and useful Improvements in Shock-Absorbers, of which the following is a full, clear, and exact specification.

My invention relates to means for retarding or modifying the action of vehicle springs, and the same has for its object more particularly to provide a shock absorber for motor vehicles in which the retarding action exerted by the shock absorber gradually increases as the distance between the axle and the vehicle body becomes greater due to the expanding action of the vehicle spring.

Further said invention has for its object to provide a shock absorber in which the retarding action is produced by the compression of one or more elastic bodies arranged at the pivotal point of a pair of connected members which have their other ends pivotally attached to the vehicle body and the axle or some other part of the running gear.

Further said invention has for its object to provide a shock absorber comprising a pair of pivotally connected arms having a plurality of elastic cushions arranged about their connected ends, of which elastic cushions certain are adapted to become operative as the outer ends of said arms are extended beyond the neutral position, and other of said elastic cushions to become operative as the outer ends of said arms are moved toward each other beyond said neutral position.

To the attainment of the aforesaid objects and ends my invention consists in the novel details of construction and in the combination, connection and arrangement of parts hereinafter more fully described and then pointed out in the claims.

In the accompanying drawings forming a part of the specification, wherein like numerals indicate like parts,—Figure 1 is a side view showing a portion of a motor vehicle with one form of shock absorber constructed according to and embodying my invention applied thereto; Fig. 2 is an enlarged detail side view showing the shock absorber detached from the vehicle; Fig. 3 is a section taken on the line 3—3 of Fig. 2; Fig. 4 is an enlarged detail side view showing the pivoted ends of the arms, the same being partly broken away and in section to expose the parts therebelow; and Fig. 5 is an enlarged detail side view showing the bolt with the means thereon for shifting one of the arms laterally in either direction around the bolt.

In said drawings 10 designates a part of the chassis or vehicle body, 11 the axle, 12 the part of an elliptical or semi-elliptical spring secured to said axle, and 13 the shock absorber.

The shock absorber 13 comprises a pair of members 14, 15. The member 14 is a single arm and is provided at its inner end with a circular head $14^a$ which is made materially thicker than the body portion of said arm 14, and is provided with a large central internally-threaded opening $14^b$. The outer end of said member or single arm 14 is provided upon its opposite sides with washers or flat bosses $14^c$, $14^c$ which are rigidly secured to said arm, and the entire end provided with an opening $14^d$, which is adapted to receive a stud or bolt 16 whereby said arm may be pivotally secured to the vehicle chassis or body 10.

The member 15 comprises two arms $15^x$, $15^x$ which are secured together at their outer ends with a spacing washer $15^c$ therebetween. The outer ends of the arms $15^x$, $15^x$ of said double member, and the spacing washer $15^c$ intermediate the same are provided with an opening $15^d$ to receive a bolt or stud 17 whereby said arm may be pivotally secured to a clip or other suitable attaching means provided upon the axle 11. At their inner ends the arms $15^x$, $15^x$ are provided with separated circular heads $15^a$, $15^a$ which correspond in outline with and embrace the head $14^a$ of the arm 14.

18 denotes a bolt having its opposite ends screw-threaded and provided with an enlarged intermediate portion 19 having external screw threads 20 thereon adapted to engage with the screw-threaded opening $14^b$, provided in the head $14^a$ of the arm 14. The enlarged intermediate portion 19 of said bolt 18 is provided at each side of said screw threads 20 with flat or cutaway portions 21, 21 which are adapted to engage with correspondingly shaped openings provided in the heads $15^a$, $15^a$ of the double arm member 15, thereby serving to key said arm members together and to said bolt 18. Upon the opposite projecting ends of said bolt are disposed elastic cushions 22, 22 which substantially correspond in diameter with the heads 15ᵃ, 15ᵃ at the inner ends of the arm members 15ˣ, 15ˣ. The elastic cushions 22, 22 are preferably made of rubber and each provided with a large central opening 23, adapted to receive freely the flattened portions 21, 21 of the stud 18, and a circular series of openings 22ᵃ, which are arranged concentrically with said large central opening 23.

24, 24 denote washers which are disposed upon the outer projecting threaded ends of the bolt 18 and bear against the outer surfaces of the elastic cushions 22, 22, and 25, 25 denote nuts working upon the opposite threaded ends of said bolt 18 whereby said elastic cushions may be intially compressed to the extent necessary to provide the desired degree of retarding action the device requires.

The operation of the apparatus is as follows: When the shock absorber is applied to a vehicle the arms 14, 15 are first so adjusted relatively to each other that the elastic cushions 22, 22 will be about equally compressed by the adjusting nuts 25, 25. If the vehicle body be caused to rise upon the running gear when the wheels encounter an obstruction in the road, the double arm 15 to which the bolt 18 is keyed will cause said bolt and the screw portion 20 thereof to rotate relatively to the intermediate head 14ᵃ of the arm 14, and as said screw portion 20 rotates it will tend to move said intermediate head 14ᵃ laterally upon the bolt 18, and in so doing will force one of the outer surfaces of said intermediate head against the inner side of one of the heads 15ᵃ, 15ᵃ of the double arm 15 and cause the same to crowd or compress the elastic cushion against the inner side of one of the washers 24, 24. The elastic cushions serve to retard the movement of said intermediate head with a gradually increasing resistance which prevents the arms 14, 15 from moving freely relatively to each other, and thus retard or modify the undue movement of the vehicle spring.

Should the vehicle body move downwardly too abruptly the action of the apparatus will be the reverse of that above described. That is to say the intermediate head will be forced laterally in the opposite direction upon the bolt 18, and compress the elastic cushions arranged upon that side of the bolt.

In order to permit the elastic cushions 22, 22 to act properly during their compression periods I have provided the same with a concentric series of openings which allow of the more even and uniform compressing of said cushions and at the same time prevent of their edges being forced outwardly too far beyond the edges of the heads 14ᵃ, 15ᵃ, and split or be otherwise injured thereby.

It is obvious that if I desire to retard the action of the vehicle spring in one direction only, i. e. up or down, one of the cushions 22 with its outside washer and its adjusting nut may be dispensed with, and the bolt 18 secured at one end directly to one of the heads 15ᵃ of the double arm 15.

Having thus described my invention what I claim and desire to secure by Letters Patent is.—

1. A shock absorber comprising a pair of arms having registering ends, a pivot extending through said registering ends, said pivot and the pivoted end portion of one of said arms being provided with co-acting means to move said end laterally upon rotation of the pivot, the pivoted end of the other of said arms being held against rotation with respect to said pivot and being free to move laterally thereon, and an elastic cushion arranged upon said pivot adjacent the outer surface of the pivoted end of said other arm, substantially as specified.

2. A shock absorber comprising a pair of arms, a head on one of said arms provided with a threaded opening, a head on the other of said arms registering with the head on said first-named arm and provided with an aperture, a bolt extending through the heads and provided with a thread engaging the threaded opening in the head of said first-named arm for moving said head laterally against the registering surface of the head of said second-named arm, the head of said second-named arm being free to move in a lateral direction, and an elastic cushion arranged upon the outer end of the bolt which extends beyond the head of said second-named arm, substantially as specified.

3. A shock absorber comprising a pair of arms, a head on one of said arms provided with a screw-threaded opening, a pair of heads on the other of said arms embracing the head of said first-named arm and provided with apertures, a bolt extending through said heads provided with a screw-threaded portion engaging with the screw-threaded opening in the head of said first-named arm for moving the head of said first-named arm laterally in either direction against the opposing surface of the heads of said second-named arm, and elastic cushions arranged upon each end of said bolt, substantially as specified.

4. A shock absorber comprising a pair of arms, a head on one of said arms provided with a screw-threaded opening, a pair of heads on the other of said arms embracing the head of said first named arm and provided with apertures, a bolt extending through said heads provided with a screw-threaded portion engaging with the screw-threaded opening in the head of said first named arm for moving the head of said first named arm laterally in either direction against the opposing surface of the heads of said second named arm, elastic cushions arranged upon each end of said bolt, and means arranged upon said bolt for adjusting the initial tension of said elastic cushions, substantially as specified.

5. A shock absorber comprising a pair of arms having intermeshing heads at their corresponding ends, a bolt extending through said heads, a screw-threaded portion on said bolt engaging with one of said heads whereby to move the same laterally in either direction upon said bolt and against the surfaces of the opposing heads of the other of said arm members, elastic cushions arranged upon the opposite ends of said bolt, members disposed upon said bolt and engaging said elastic cushions, and adjusting means disposed upon the ends of said bolt and engaging said members whereby severally to adjust the initial tension of said elastic cushions, substantially as specified.

6. A shock absorber comprising a pair of pivoted arms, a head provided upon one of said arms having a screw-threaded aperture therein, a pair of heads provided upon the corresponding ends of the other of said arms having openings therein registering with the screw-threaded opening in the head of said first named arm, a bolt having an enlarged central portion, screw threads arranged upon said enlarged central portion engaging with the screw-threaded opening in the head of said first named arm, elastic cushions arranged upon the opposite ends of said bolt, washers disposed upon the outer ends of said bolts and engaging said elastic cushions, and adjusting nuts disposed upon the ends of said bolt for severally adjusting the tension of said elastic cushions, substantially as specified.

7. A shock absorber comprising a pair of pivotally connected arms; one of said arms having an opening provided with a cam groove, and the other of said arms having a polygonal opening registering with the opening in the end of said first named arm, a bolt having a cam projection thereon adapted to engage with the cam groove in said first named arm for moving the end of said first named arm laterally against the end of said second named arm, and polygonal portions adapted to be received by the polygonal openings in said second named arm, elastic cushions arranged upon the opposite ends of said bolt for retarding the movement of said arms with a gradually increasing resistance, and means for severally adjusting the initial tension of said elastic cushions, substantially as specified.

8. A shock absorber comprising a pair of pivotally connected arms, one of said arms terminating in a single circular head having a large central screw-threaded opening, and the other of said arms terminating in a pair of correspondingly shaped heads, polygonal openings provided in said last named heads, a bolt having an enlarged intermediate portion provided with external screw threads adapted to engage with the screw-threaded opening in said single head of said first named arm, and polygonal portions arranged at the opposite ends of said enlarged intermediate portion adapted to be received by the correspondingly shaped openings in the heads of said second named arm, elastic cushions provided with transverse openings and disposed upon the opposite ends of said bolt, for retarding the movement of said arms beyond their neutral position with a gradually increasing resistance, washers on said bolt bearing against the outer surfaces of said elastic cushions, and nuts on the outer ends of said bolt for severally adjusting the initial tension of said elastic cushions, substantially as specified.

Signed at the city of New York, in the county and State of New York, this 15th day of November, one thousand nine hundred and thirteen.

CHARLES LAPORTE.

Witnesses:
 CONRAD A. DIETERICH,
 GUSTAV LANGE, Jr.